UNITED STATES PATENT OFFICE.

WILLIAM H. ALLEN, OF MELROSE, AND CLINTON LOVELL, OF BOSTON, MASSACHUSETTS.

RUBBER COMPOUND.

SPECIFICATION forming part of Letters Patent No. 438,595, dated October 14, 1890.

Application filed February 28, 1890. Serial No. 342,131. (No specimens.)

*To all whom it may concern:*

Be it known that we, WILLIAM H. ALLEN, of Melrose, in the county of Middlesex, and CLINTON LOVELL, of Boston, in the county of Suffolk, both in the State of Massachusetts, have invented certain new and useful Improvements in Rubber Compounds, of which the following is a specification.

Various formulas are followed by manufacturers of rubber goods, and the essential elements or ingredients of all are rubber, sulphur, litharge, and whiting. Raw hydrous silicate of magnesia—viz., talc—has been used, but it had the effect of decreasing the elasticity of the product, and subsequently hardened the same to such an extent as to render the goods valueless. We have found that the product termed "lithargite" in a concurrent application filed by us, the same being a pulverized calcined silicate of magnesia, is a perfect substitute for litharge in rubber compounds.

This invention therefore consists in a rubber compound having as it essential ingredients lithargite, (calcined silicate of magnesia,) rubber, and sulphur, with or without other ingredients.

The substance lithargite is produced, as described in the application referred to, by pulverizing rock of the magnesic silicate family and furnacing or calcining the same until (in the case of hydrous silicates) the water is driven off and until the glassy scales or crystals of which the mineral is composed are separated and become spongy, thus producing a physical change in their structure, causing the mineral to shrink together and becoming more dense. This substance combines the sulphur and rubber quickly and enabels the vulcanization of the product at a low heat, resulting in goods of great elasticity and of good quality, superior in both respects to goods containing litharge.

The compound may be employed in the manufacture of rubber goods of all kinds, and in fact wherever it may be found desirable to use it, and it may be used in any manner which circumstances or the exigencies of the case may suggest.

What we claim is—

A plastic compound composed, essentially, of rubber, sulphur, and lithargite, (pulverized calcined magnesic silicate,) substantially as described.

In testimony whereof we have signed our names to this specification, in the presence of two subscribing witnesses, this 25th day of February, A. D. 1890.

WILLIAM H. ALLEN.
CLINTON LOVELL.

Witnesses:
ARTHUR W. CROSSLEY,
A. D. HARRISON.